United States Patent
Yoon et al.

(10) Patent No.: US 8,913,367 B2
(45) Date of Patent: Dec. 16, 2014

(54) MULTILAYERED CERAMIC CAPACITOR AND METHOD OF MANUFACTURING THE SAME

(71) Applicant: Samsung Electro-Mechanics Co., Ltd., Suwon, Gyunggi-do (KR)

(72) Inventors: Byung Kwon Yoon, Gyunggi-do (KR); Jae Yeol Choi, Gyunggi-Do (KR); Sang Hyuk Kim, Gyunggi-do (KR)

(73) Assignee: Samsung Electro-Mechanics Co., Ltd., Suwon-si, Gyeonggi-Do (KR)

( * ) Notice: Subject to any disclaimer, the term of this patent is extended or adjusted under 35 U.S.C. 154(b) by 2 days.

(21) Appl. No.: 13/737,614

(22) Filed: Jan. 9, 2013

(65) Prior Publication Data

US 2014/0160616 A1   Jun. 12, 2014

(30) Foreign Application Priority Data

Dec. 11, 2012  (KR) .................. 10-2012-0143470

(51) Int. Cl.
*H01G 4/005* (2006.01)
*H01G 4/30* (2006.01)
*H01G 4/12* (2006.01)

(52) U.S. Cl.
CPC ...................................... *H01G 4/12* (2013.01)
USPC ................. 361/303; 361/301.4; 29/25.42

(58) Field of Classification Search
USPC ................. 361/303, 305, 301.4, 311
See application file for complete search history.

(56) References Cited

U.S. PATENT DOCUMENTS

| | | | |
|---|---|---|---|
| 6,038,121 A | 3/2000 | Naito et al. | |
| 6,995,967 B2* | 2/2006 | Togashi et al. | 361/303 |
| 8,130,484 B2* | 3/2012 | Koga et al. | 361/303 |
| 2004/0027787 A1 | 2/2004 | Yamauchi et al. | |

FOREIGN PATENT DOCUMENTS

| | | |
|---|---|---|
| JP | 6127327 U | 2/1986 |
| JP | 10-289837 A | 10/1998 |
| JP | 2000114096 A | 4/2000 |
| JP | 2002-299152 A | 10/2002 |
| JP | 2004-140183 A | 5/2004 |
| JP | 2004-228514 A | 8/2004 |
| JP | 2008-258481 A | 10/2008 |
| JP | 2009-026872 A | 2/2009 |
| JP | 2009-054973 A | 12/2009 |
| JP | 2012-114353 A | 6/2012 |

OTHER PUBLICATIONS

Notice of Office Action Korean Patent Application No. 10-2012-0143470 dated Dec. 30, 2013 with English translation.
Notice of Office Action Japanese Patent Application No. 2013-002411 dated Oct. 22, 2013.
Japanese Office Action issued in Japanese Application No. 2013-002411 dated Mar. 25, 2014, w/English translation.

* cited by examiner

*Primary Examiner* — Eric Thomas
(74) *Attorney, Agent, or Firm* — McDermott Will & Emery LLP

(57) ABSTRACT

There is provided a multilayered ceramic capacitor including: a ceramic body; a plurality of first and second internal electrodes having first and second lead-out portions overlapped with each other, respectively, and exposed to one surface of the ceramic body; first and second external electrodes formed on one surface of the ceramic body and electrically connected to the first and second lead-out portions, respectively; and an insulating layer formed on one surface of the ceramic body to cover exposed portions of the first and second lead-out portions, wherein the first lead-out portion has a first overlap increase part of which a forward edge has an inclined surface, and the second lead-out portion has a second overlap increase part of which a forward edge has an inclined surface.

10 Claims, 3 Drawing Sheets

MULTILAYERED CERAMIC CAPACITOR AND METHOD OF MANUFACTURING THE SAME

CROSS-REFERENCE TO RELATED APPLICATIONS

This application claims the priority of Korean Patent Application No. 10-2012-0143470 filed on Dec. 11, 2012, in the Korean Intellectual Property Office, the disclosure of which is incorporated herein by reference.

BACKGROUND OF THE INVENTION

1. Field of the Invention

The present invention relates to a multilayered ceramic capacitor and a method of manufacturing the same.

2. Description of the Related Art

In general, capacitors, inductors, piezoelectric elements, varistors, thermistors, and the like, are electronic components using a ceramic material.

Among ceramic electronic components, a multilayered ceramic capacitor (MLCC) is an electronic component having advantages such as miniaturizability, high capacitance, and ease of mounting.

The multilayered ceramic capacitor is a chip shaped condenser mounted on circuit boards of various electronic products such as display devices, for example, liquid crystal displays (LCDs), plasma display panels (PDPs), or the like, computers, personal digital assistants (PDAs), mobile phones, and the like, serving to charge electricity or discharge electricity.

The multilayered ceramic capacitor may include a plurality of multilayered dielectric layers, internal electrodes disposed to face each other, having dielectric layers interposed therebetween, and external electrodes electrically connected to respective internal electrodes.

Recently, as electronic products have been miniaturized, microminiaturization and the implementation of super high capacitance in the multilayered ceramic capacitors used in the electronic products have been required.

Therefore, a ceramic capacitor in which thicknesses of the dielectric layer and the internal electrode are thinned to allow for the micro-miniaturization of products and in which the number of multilayered dielectric layers is increased for super high capacitance has been manufactured, but there has been a limitation in increasing the capacitance of the product through only this configuration.

In a common multilayered ceramic capacitor, since an internal electrode having a predetermined thickness is printed on a ceramic sheet so as to have an area smaller than that of the sheet and then multilayered, a step portion with respect to a margin portion is necessarily generated, and the step portion may be increased in margin portions in a width direction of the dielectric layer.

Meanwhile, a multilayered ceramic capacitor having a structure in which all internal electrodes may be exposed to the same surface, for example, a lower surface, to allow the lower surface thereof to be a mounting surface has been disclosed.

In the case of the multilayered ceramic capacitor of which the lower surface is a mounting surface, in the margin portions in the width direction, having a right-angularly formed step, a possibility that a cracking will be generated by the step portion with the dielectric layer may be relatively high, and an area of the internal electrodes vertically overlapped with each other may be reduced by an area corresponding to the formed margin portions, such that capacitance may be reduced.

A structure in which lead-out portions of internal electrodes are exposed to the same surface of a substrate is disclosed in the following Patent Document 1, but a structure in which a connection portion between the lead-out portion and the internal electrode has an inclined surface is not disclosed therein.

A structure in which a connection portion between a lead-out portion and an internal electrode is inclined, but internal electrodes are alternately exposed to both end surfaces of a ceramic body is disclosed in the following Patent Document 2.

Related Art Document (Patent Document 1) Japanese Patent Laid-open Publication No. 1998-289837

(Patent Document 2) Japanese Patent Laid-open Publication No. 2004-228514

SUMMARY OF THE INVENTION

An aspect of the present invention provides a multilayered ceramic capacitor capable of increasing regions of internal electrodes overlapped with one another and unifying a direction in which the internal electrodes are exposed to thereby allow a lower surface thereof to be a mounting surface while increasing capacitance, improving resistance against cracking caused by a step portion between an internal electrode and a dielectric layer, and increasing an area of the overlapped region of the internal electrodes to thereby further increase capacitance, and a method of manufacturing the same.

According to an aspect of the present invention, there is provided a multilayered ceramic capacitor including: a ceramic body in which a plurality of dielectric layers are stacked; a plurality of first and second internal electrodes alternately formed on the plurality of dielectric layers, having first and second lead-out portions overlapped with each other, respectively, and exposed to one surface of the ceramic body; first and second external electrodes formed on one surface of the ceramic body and electrically connected to the first and second lead-out portions, respectively; and an insulating layer formed on one surface of the ceramic body so as to cover exposed portions of the first and second lead-out portions, wherein the first lead-out portion has a first overlap increase part of which a forward edge has an inclined surface at one edge portion exposed to one surface of the ceramic body, and the second lead-out portion has a second overlap increase part of which a forward edge has an inclined surface at the other edge portion exposed to one surface of the ceramic body.

The forward edges of the first and second overlap increase parts may have a flat inclined surface.

The forward edges of the first and second overlap increase parts may have outwardly convex inclined surfaces.

Ratios of areas of margin portions in the width direction to areas obtained by adding the areas of the margin portions in the width direction, which are non-overlapped regions of the dielectric layer, to areas of the first and second internal electrodes, may be 0.3% or more, respectively.

The first external electrode may be connected to a region of the first lead-out portion that is not overlapped with the second lead-out portion, and the second external electrode may be connected to a region of the second lead-out portion that is not overlapped with the first lead-out portion.

According to another aspect of the present invention, there is provided a method of manufacturing a multilayered ceramic capacitor, the method including: forming a first internal electrode on a first ceramic sheet so that a first lead-out portion is exposed through one surface of the first ceramic sheet; forming a second internal electrode on a second ceramic sheet so that a second lead-out portion having a region overlapped with the first lead-out portion is exposed through one surface of the second ceramic sheet; forming a ceramic body by alternately multi-layering a plurality of first and second ceramic sheets on which the first and second internal electrodes are formed and firing the multilayered ceramic sheets; forming first and second external electrodes on one surface of the ceramic body so as to be electrically connected to the first and second lead-out portions, respectively; and forming an insulation layer on one surface of the ceramic body so as to cover exposed portions of the first and second lead-out portions, wherein in the first lead-out portion, a first overlap increase part of which a forward edge has an inclined surface is formed at one edge portion exposed to one surface of the ceramic first sheet, and in the second lead-out portion, a second overlap increase part of which a forward edge has an inclined surface is formed at the other edge portion exposed to one surface of the second ceramic sheet.

The insulating layer may be formed by applying ceramic slurry to one surface of the ceramic body so as to cover the entirety of exposed portions of the first and second lead-out portions.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
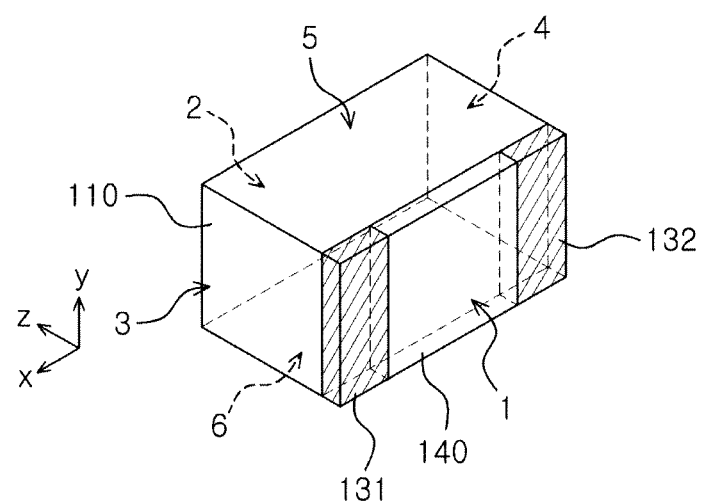
FIG. 1 is a transparent perspective view schematically showing a multilayered ceramic capacitor according to an embodiment of the present invention.

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

In the drawings, the shapes and dimensions of elements may be exaggerated for clarity, and the same reference numerals will be used throughout to designate the same or like elements.

Figure 2:
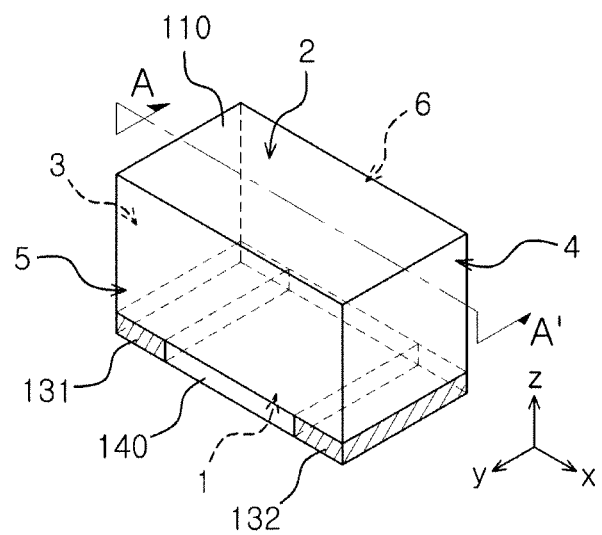
FIG. 2 is a transparent perspective view showing the multilayered ceramic capacitor of FIG. 1 in a direction in which the capacitor is mounted.
Figure 3:
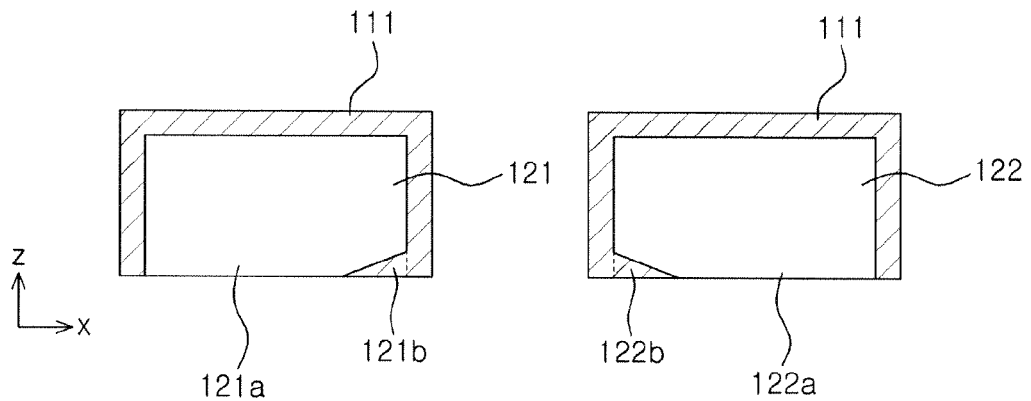
FIG. 3 is a transverse cross-sectional view showing first and second internal electrodes of the multilayered ceramic capacitor of FIG. 1.
Figure 4:
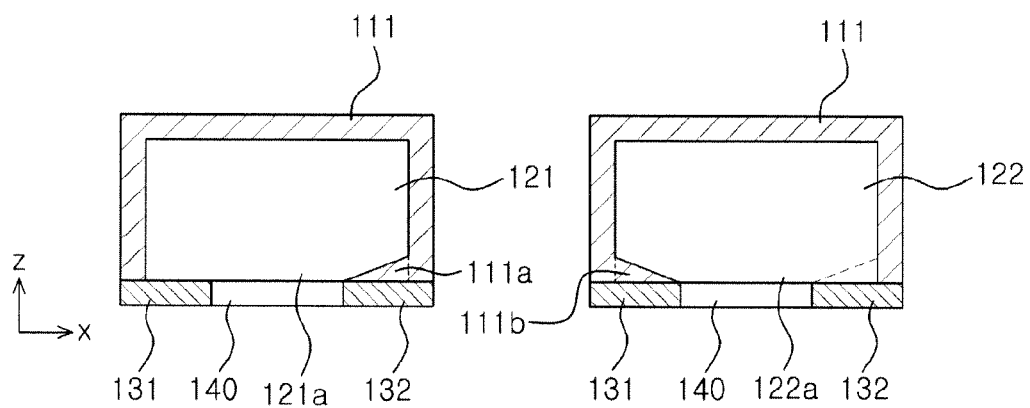
FIG. 4 is a transverse cross-sectional view showing a structure in which first and second external electrodes and an insulating layer are formed at the first and second internal electrodes of FIG. 3.

FIG. 1 is a transparent perspective view schematically showing a multilayered ceramic capacitor according to an embodiment of the present invention; FIG. 2 is a transparent perspective view showing the multilayered ceramic capacitor of FIG. 1 in a direction in which the capacitor is mounted; FIG. 3 is a transverse cross-sectional view showing first and second internal electrodes of the multilayered ceramic capacitor of FIG. 1; and FIG. 4 is a transverse cross-sectional view showing a structure in which first and second external electrodes and an insulating layer are formed at the first and second internal electrodes of FIG. 3.

According to the embodiment of the present invention, an x-direction refers to a direction in which first and second external electrodes 131 and 132 are formed, having a predetermined interval therebetween, a y-direction refers to a direction in which first and second internal electrodes 121 and 122 are stacked, having a dielectric layer 111 therebetween, and a z-direction refers to a width direction of a ceramic body 110 in which first and second lead-out portions 121a and 122a of the first and second internal electrodes 121 and 122 are exposed.

Referring to FIGS. 1 through 4, a multilayered ceramic capacitor 100 according to the embodiment of the present invention may include a ceramic body 110, the first and second internal electrodes 121 and 122 formed in the ceramic body 110, and the first and second external electrodes 131 and 132 and an insulating layer 140 that are formed on one surface of the ceramic body 110.

According to the present embodiment, the ceramic body 110 may have first and second surfaces 1 and 2 facing each other, and third to sixth surfaces 3 to 6 connecting the first and second surfaces 1 and 2 to each other. According to the embodiment of the present invention, the first surface 1 of the ceramic body 110 may be a mounting surface disposed at a mounting area of a circuit board.

A shape of the ceramic body 110 is not particularly limited, but may be a rectangular parallelepiped shape having the first to sixth surfaces 1 to 6 as shown in FIGS. 1 and 2. Further, a size of the ceramic body 110 is not particularly limited. For example, the ceramic body 110 may have a size of 1.0 mm×0.5 mm, thereby configuring a multilayered ceramic capacitor having relatively high capacitance.

The ceramic body 110 as described above may be formed by multi-layering a plurality of dielectric layers 111 and then firing the multilayered dielectric layers 111. Here, the plurality of dielectric layers 111 configuring the ceramic body 110 is in a sintered state and may be integrated so as not to confirm a boundary between the dielectric layers 111 adjacent to each other.

The dielectric layer 111 may be formed by firing a ceramic green sheet including a ceramic powder, an organic solvent, and an organic binder. As the ceramic powder, a high k material, for example, a barium titanate ($BaTiO_3$) based material, a strontium titanate ($SrTiO_3$) based material, or the like, may be used. However, the ceramic powder is not limited thereto.

After the first and second internal electrodes 121 and 122 may be formed on a ceramic sheet forming the dielectric layer 111 and alternately multilayered, the first and second internal electrodes 121 and 122 may be disposed in the ceramic body 110 in the y-direction so as to face each other, having one dielectric layer 111 therebetween.

The first and second internal electrodes 121 and 122 may be electrically insulated from each other by the dielectric layer 111 disposed therebetween. According to the embodiment of the present invention, the first and second internal electrodes 121 and 122 may be disposed perpendicularly to the mounting surface, that is, the first surface 1, of the multilayered ceramic capacitor.

The first and second internal electrodes 121 and 122 may be formed by printing a conductive paste including a conductive metal on at least one surface of the dielectric layer 111. In this case, the conductive metal may be Ni, Cu, Pd, or an alloy thereof, but is not limited thereto. In addition, as a printing method of the conductive paste, a screen printing method, a gravure printing method, or the like, may be used, but the present invention is not limited thereto.

According to the embodiment of the present invention, the first and second internal electrodes 121 and 122 may have the first and second lead-out portions 121a and 122a exposed to the first surface 1 of the ceramic body 110 so as to be connected to the first and second external electrodes 131 and 132 having different polarities, respectively.

According to the embodiment of the present invention, the first and second lead-out portions 121a and 122a may refer to regions of a conductive pattern forming the first and second internal electrodes 121 and 122, wherein the region on which a width W of the conductive pattern increases is exposed to the first surface 1 of the ceramic body 110.

Generally, the first and second internal electrodes 121 and 122 of the multilayered ceramic capacitor may form capacitance by regions thereof overlapped with each other, and the first and second lead-out portions 121a and 122a connected to the first and second external electrodes 131 and 132 having different polarities do not have regions overlapped with each other.

However, according to the embodiment of the present invention, the first and second lead-out portions 121a and 122a may have regions overlapped with each other. That is, the first and second lead-out portions 121a and 122a may be exposed to the first surface 1, and the exposed regions as described above may be partially overlapped with each other, thereby increasing the capacitance of the capacitor.

According to the embodiment of the present invention, one edge portions of the dielectric layer 111 respectively facing the first and second lead-out portions 121a and 122a are provided with first and second margin portions 111a and 111b, respectively, such that the margin portions are not overlapped with each other.

In the case of the existing multilayered ceramic capacitor having a lower surface electrode, a shape of the margin portions is a right-angularly shaped step form. However, in the present embodiment, one edge portions respectively facing the first and second lead-out portions 121a and 122a are provided with first and second overlap increase parts 121b and 122b of which forward edges are formed to be inclined surfaces, such that forward edges of the first and second margin portions 111a and 111b may also be formed to be inclined surfaces.

The first and second overlap increase parts 121b and 122b may decrease the margin portions in the width direction (the z-direction) to decrease the step portion of the dielectric layer 111 while increasing an overlapped area between the first and second internal electrodes 121 and 122 to increase the capacitance, thereby decreasing a possibility that a cracking will be generated.

The forward edges of the first and second overlap increase parts 121b and 122b according to the embodiment of the present invention may have a flat inclined surface. Here, ratios of areas of the margin portions in the width direction, which are non-overlapped regions, to areas obtained by adding the areas of the margin portions in the width direction, which are non-overlapped regions, to areas of the first and second internal electrodes 121 and 122 including the first and second overlap increase parts 121b and 122b may be 0.3% or more, respectively.

In the case in which the ratios of the areas of the margin portions in the width direction, which are the non-overlapped regions, to the areas obtained by adding the areas of the margin portions in the width direction, which are non-overlapped regions, to the areas of the first and second internal electrodes 121 and 122 including the first and second overlap increase parts 121b and 122b are smaller than 0.3%, respectively, the margin portions are excessively narrow, such that the first and second overlap increase parts 121b and 122b may be contacted with the second and first lead-out portions 122a and 121a, respectively to increase the possibility that the short will be generated, and an area of a portion contacted with the external electrode may be reduced to generate a difference in electric characteristics.

The first and second external electrodes 131 and 132 may be electrically connected to the first and second lead-out portions 121a and 122a, respectively. The first external electrode 131 may be connected to a region of the first lead-out portion 121a that is not overlapped with the second lead-out portion 122a, and the second external electrode 132 may be connected to a region of the second lead-out portion 122a that is not overlapped with the first lead-out portion 121a.

In a view on the right of FIG. 4, an overlapped area between the first margin portion 111a of the first internal electrode 121 and the second lead-out portion 122a of the second internal electrode 122 is shown by a dotted line.

The insulating layer 140 may be formed between the first and second external electrodes 131 and 132 on the first surface 1 of the ceramic body 110. The insulating layer 140 may cover the first and second lead-out portions 121a and 122a exposed to the first surface 1 of the ceramic body 110 and be formed so as to cover the entire overlapped region between the first and second lead-out portions 121a and 122a.

The insulating layer 140 may be formed so as to completely fill the first surface 1 of the ceramic body 110 between the first and second external electrodes 131 and 132. However, the present invention is not limited thereto. The insulating layer 140 may be formed so as to only cover the overlapped area between the first and second lead-out portions 121a and 122a and be spaced apart from the first and second external electrodes 131 and 132 by a predetermined interval.

The insulating layer 140 formed as described above may serve to prevent a short circuit between the first and second internal electrodes 121 and 122 and the first and second external electrodes 131 and 132 and prevent internal defects such as deterioration of moisture resistance, or the like.

Figure 5:
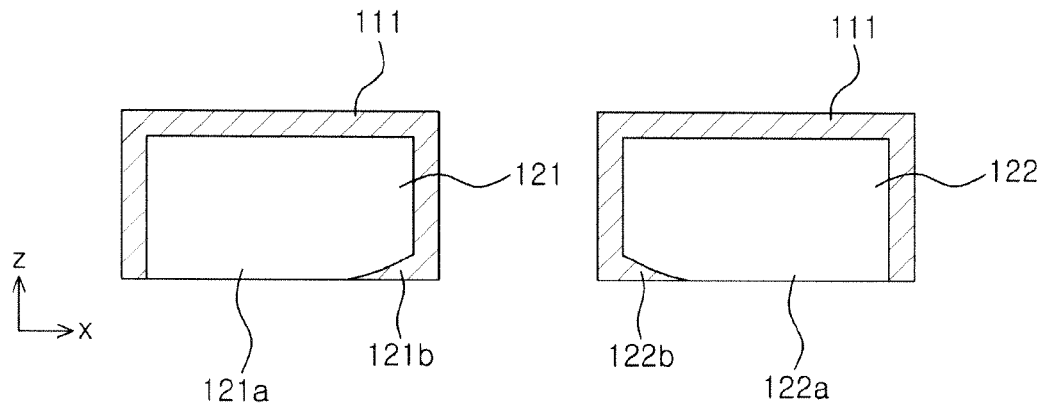
FIG. 5 is a transverse cross-sectional view showing first and second internal electrodes of the multilayered ceramic capacitor according to another embodiment of the present invention.
Figure 6:
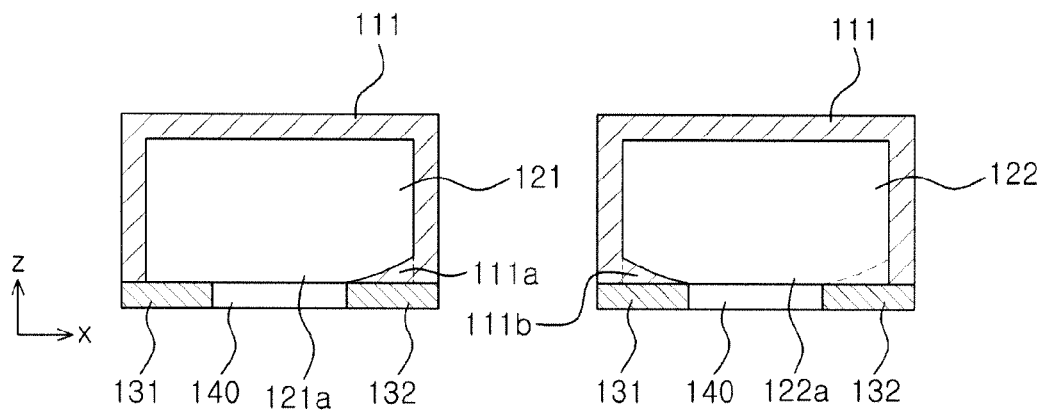
FIG. 6 is a transverse cross-sectional view showing a structure in which first and second external electrodes and an insulating layer are formed at the first and second internal electrodes of FIG. 5.

FIG. 5 is a transverse cross-sectional view showing first and second internal electrodes of the multilayered ceramic capacitor according to another embodiment of the present invention; and FIG. 6 is a transverse cross-sectional view showing a structure in which first and second external electrodes and an insulating layer are formed at the first and second internal electrodes of FIG. 5. Hereinafter, components different from components in the above-mentioned embodiment will be mainly described, and a detailed description of the same components will be omitted.

Referring to FIGS. 5 and 6, in the multilayered ceramic capacitor according to the embodiment of the present invention, forward edges of the first and second overlap increase parts 121b and 122b of the first and second internal electrodes 121 and 122 may have an outwardly convex curve.

Here, ratios of areas of the margin portions in the width direction, which are non-overlapped regions, to area obtained by adding the areas of the margin portions 111a and 111b in the width direction, which are non-overlapped regions, to areas of the first and second internal electrodes 121 and 122 including the first and second overlap increase parts 121b and 122b may be 0.3% or more, respectively.

In the case in which the ratios of the areas of the margin portions 111a and 111b in the width direction, which are the non-overlapped regions, to the areas obtained by adding the areas of the margin portions 111a and 111b in the width direction, which are non-overlapped regions of the dielectric layer 111, to the areas of the first and second internal electrodes 121 and 122 including the first and second overlap increase parts 121b and 122b, are smaller than 0.3%, respectively, the margin portions in the width direction are excessively narrow, such that the first and second overlap increase parts 121b and 122b may be contacted with the second and first lead-out portions 122a and 121a, respectively, to increase the possibility that the short will be generated, and an area of a portion contacted with the external electrode may be reduced to generate a difference in electric characteristics.

Hereinafter, a method of manufacturing a multilayered ceramic capacitor according to the embodiment of the present invention will be described.

First, a plurality of first and second ceramic sheets are prepared. The first and second ceramic sheets to form a dielectric layer 111 of a ceramic body 110 may be manufactured by mixing ceramic powders, a polymer, a solvent and the like to prepare slurry and manufacturing the prepared slurry in a sheet shape having a thickness of several μm by a doctor blade method, or the like.

The ceramic powder may include a barium titanate (BaTiO$_3$) based material. However, the present invention is not limited thereto. For example, the ceramic powder may include Ba$_{1-x}$Ca$_x$)TiO$_3$, Ba(Ti$_{1-y}$)O$_3$, (Ba$_{1-x}$Ca$_x$)(Ti$_{1-y}$Zr$_y$)O$_3$, or Ba (Ti$_{1-y}$Zr$_y$) O$_3$ in which Ca, Zr or the like is partially dissolved in BaTiO$_3$, or the like.

The slurry may be prepared by mixing a ceramic additive, an organic solvent, a plasticizer, a binder, and a dispersant with this ceramic powder material using a basket mill.

Next, a conductive paste may be printed on at least one surface of each of the first and second ceramic sheets to have a predetermined thickness, for example, a thickness of 0.1 to 2.0 μm, to thus form the first and second internal electrodes 121 and 122.

In the first internal electrode 121, a first lead-out portion 121a may be exposed to one end surface of the first ceramic sheet, and one edge portion of the first lead-out portion 121a may be provided with a first overlap increase part 121b such that the first ceramic sheet has a first margin portion 111a.

The second internal electrode 122 may have a second lead-out portion 122a exposed to one end surface of the second ceramic sheet while having a region overlapped with the first lead-out portion 121a. In the second lead-out portion 122a, an edge portion of the other portion of the second lead-out portion facing the first overlap increase part 121b may be provided with a second overlap increase part 122b so that the second ceramic sheet has a second margin portion 111b that is not overlapped with the first margin portion 111a.

As a printing method of the conductive paste, a screen printing method, a gravure printing method, or the like, may be used, and the conductive paste may include a metal powder, a ceramic powder, silica (SiO$_2$) powder, and the like.

In this case, forward edges of the first and second overlap increase parts 121b and 122b may be formed to have a flat inclined surface or an outwardly convex curve.

Ratios of areas of the margin portions 111a and 111b in the width direction, which are non-overlapped regions, to areas obtained by adding the areas of the margin portions 111a and 111b in the width direction, which are non-overlapped regions, to areas of the first and second internal electrodes 121 and 122 including the first and second overlap increase parts 121b and 122b may be 0.3% or more, respectively.

Then, the plurality of first and second ceramic sheets including the first and second internal electrodes 121 and 122 formed thereon are alternately multilayered and pressed in a direction in which the ceramic sheets are stacked, thereby compressing the multilayered first and second ceramic sheets and the first and second internal electrodes 121 and 122 with each other. Through the above-mentioned process, a multilayer body in which a plurality of dielectric layers 111 and a plurality of first and second internal electrodes 121 and 122 are alternately multilayered may be formed.

Next, the multilayer body may be cut per region corresponding to one capacitor to be formed in a chip form, and the cut chip is plasticized and sintered at a relatively high temperature, followed by polishing the sintered chip, thereby completing a ceramic body 110 having the first and second internal electrodes 121 and 122.

Then, first and second external electrodes 131 and 132 are formed on a first surface 1 of the ceramic body 110 so as to contact exposed portions of first and second lead-out portions 121a and 122a to thereby be electrically connected to the first and second lead-out portions, respectively.

The first external electrode 131 may be formed to be vertically elongated in a thickness direction of the ceramic body 110, on a region of the first surface 1 of the ceramic body 110 on which the first lead-out portion 121a is not overlapped with the second lead-out portion 122a.

The second external electrode 132 may be formed to be vertically elongated in a thickness direction of the ceramic body 110, on a region of the first surface 1 of the ceramic body 110 on which the second lead-out portion 122a is not overlapped with the first lead-out portion 121a.

Due to the configuration as described above, the first surface 1 of the ceramic body 110 may be a mounting surface in order to be mounted on a substrate, or the like.

Next, an insulating layer 140 may be formed by applying the ceramic slurry to the first surface 1 of the ceramic body 110 so as to cover the entirety of the exposed portions of the first and second lead-out portions 121a and 122a exposed to the first surface 1 of the ceramic body 110. As a method of applying the slurry, for example, there is a spray method, a method of using a roller, or the like, but the present invention is not limited thereto.

As set forth above, according to the embodiment of the present invention, the overlapped regions between the first and second lead-out portions are increased, and both of the first and second lead-out portions are exposed to one surface of the ceramic body, such that the capacitance may be increased, and the lower surface may be a mounting surface.

In addition, the internal electrode is formed without the margin in the width direction, and the insulating layer is formed on the surface of the ceramic body to which the internal electrode of the ceramic body is exposed, such that there is no need to consider alignment of the margin, and the margin may be formed to have a predetermined thickness to be desired by a user.

Further, the first lead-out portion has the first overlap increase part of which the forward edge has the inclined surface at one edge portion exposed to one surface of the ceramic body, and the second lead-out portion has the second overlap increase part of which the forward edge has the inclined surface at the other edge portion exposed to one surface of the ceramic body, such that the overlapped portions of the internal electrodes may be significantly increased, and the area of the margin portion of the dielectric layer may be decreased. Therefore, the resistance against the cracking caused by the step portion may be improved, and the capacitance of the multilayered ceramic capacitor may be further increased.

While the present invention has been shown and described in connection with the embodiments, it will be apparent to those skilled in the art that modifications and variations can be made without departing from the spirit and scope of the invention as defined by the appended claims.

What is claimed is:

1. A multilayered ceramic capacitor comprising:
a ceramic body including a plurality of dielectric layers stacked therein;
a plurality of first and second internal electrodes alternately formed on the plurality of dielectric layers, having first and second lead-out portions overlapped with each other, respectively, and exposed to one surface of the ceramic body;
first and second external electrodes formed on one surface of the ceramic body and electrically connected to the first and second lead-out portions, respectively; and
an insulating layer formed on one surface of the ceramic body so as to cover exposed portions of the first and second lead-out portions,
wherein the first lead-out portion having a first overlap increase part of which a forward edge has a flat inclined surface at one edge portion exposed to one surface of the ceramic body, and the second lead-out portion having a second overlap increase part of which a forward edge has a flat inclined surface at the other edge portion exposed to one surface of the ceramic body, and
wherein ratios of areas of margin portions in a width direction to areas obtained by adding the areas of the margin portions in the width direction, which are non-overlapped regions of the dielectric layer, to areas of the first and second internal electrodes, are 0.3% or more, respectively.

2. The multilayered ceramic capacitor of claim 1, wherein the first external electrode is connected to a region of the first lead-out portion that is not overlapped with the second lead-out portion, and the second external electrode is connected to a region of the second lead-out portion that is not overlapped with the first lead-out portion.

3. A method of manufacturing a multilayered ceramic capacitor, the method comprising:
forming a first internal electrode on a first ceramic sheet so that a first lead-out portion is exposed through one surface of the first ceramic sheet;
forming a second internal electrode on a second ceramic sheet so that a second lead-out portion having a region overlapped with the first lead-out portion is exposed through one surface of the second ceramic sheet;
forming a ceramic body by alternately multi-layering a plurality of first and second ceramic sheets on which the first and second internal electrodes are formed and firing the multilayered ceramic sheets;
forming first and second external electrodes on one surface of the ceramic body so as to be electrically connected to the first and second lead-out portions, respectively, and
forming an insulation layer on one surface of the ceramic body so as to cover exposed portions of the first and second lead-out portions,
wherein in the first lead-out portion, a first overlap increase part of which a forward edge has a flat inclined surface is formed at one edge portion exposed to one surface of the first ceramic sheet, and in the second lead-out portion, a second overlap increase part of which a forward edge has a flat inclined surface is formed at the other edge portion exposed to one surface of the second ceramic sheet, and
wherein ratios of areas of margin portions in a width direction to areas obtained by adding the areas of the margin portions in the width direction, which are non-overlapped regions of the dielectric layer, to areas of the first and second internal electrodes, are 0.3% or more, respectively.

4. The method of claim 3, wherein in the forming of the first and second external electrodes, the first external electrode is formed on one surface of the ceramic body at a region of the first lead-out portion that is not overlapped with the second lead-out portion in a thickness direction of the ceramic body, and the second external electrode is formed on one surface of the ceramic body at a region of the second lead-out portion that is not overlapped with the first lead-out portion in the thickness direction of the ceramic body.

5. The method of claim 3, wherein in the forming of the insulating layer, the insulating layer is formed by applying ceramic slurry to one surface of the ceramic body so as to cover the entirety of the exposed portions of the first and second lead-out portions.

6. A multilayered ceramic capacitor comprising:
a ceramic body including a plurality of dielectric layers stacked therein;
a plurality of first and second internal electrodes alternately formed on the plurality of dielectric layers, having first and second lead-out portions overlapped with each other, respectively, and exposed to one surface of the ceramic body;
first and second external electrodes formed on one surface of the ceramic body and electrically connected to the first and second lead-out portions, respectively; and
an insulating layer formed on one surface of the ceramic body so as to cover exposed portions of the first and second lead-out portions,
wherein the first lead-out portion having a first overlap increase part of which a forward edge has outwardly convex inclined surface at one edge portion exposed to one surface of the ceramic body, and the second lead-out portion having a second overlap increase part of which a forward edge has outwardly convex inclined surface at the other edge portion exposed to one surface of the ceramic body, and
wherein ratios of areas of margin portions in a width direction to areas obtained by adding the areas of the margin portions in the width direction, which are non-overlapped regions of the dielectric layer, to areas of the first and second internal electrodes, are 0.3% or more, respectively.

7. The multilayered ceramic capacitor of claim 6, wherein the first external electrode is connected to a region of the first lead-out portion that is not overlapped with the second lead-out portion, and the second external electrode is connected to a region of the second lead-out portion that is not overlapped with the first lead-out portion.

8. A method of manufacturing a multilayered ceramic capacitor, the method comprising:
forming a first internal electrode on a first ceramic sheet so that a first lead-out portion is exposed through one surface of the first ceramic sheet;

forming a second internal electrode on a second ceramic sheet so that a second lead-out portion having a region overlapped with the first lead-out portion is exposed through one surface of the second ceramic sheet;

forming a ceramic body by alternately multi-layering a plurality of first and second ceramic sheets on which the first and second internal electrodes are formed and firing the multilayered ceramic sheets;

forming first and second external electrodes on one surface of the ceramic body so as to be electrically connected to the first and second lead-out portions, respectively, and forming an insulation layer on one surface of the ceramic body so as to cover exposed portions of the first and second lead-out portions, wherein in the first lead-out portion, a first overlap increase part of which a forward edge has outwardly convex inclined surface is formed at one edge portion exposed to one surface of the first ceramic sheet, and in the second lead-out portion, a second overlap increase part of which a forward edge has outwardly convex inclined surface is formed at the other edge portion exposed to one surface of the second ceramic sheet, and wherein ratios of areas of margin portions in a width direction to areas obtained by adding the areas of the margin portions in the width direction, which are non-overlapped regions of the dielectric layer, to areas of the first and second internal electrodes, are 0.3% or more, respectively.

9. The method of claim 8, wherein in the forming of the first and second external electrodes, the first external electrode is formed on one surface of the ceramic body at a region of the first lead-out portion that is not overlapped with the second lead-out portion in a thickness direction of the ceramic body, and the second external electrode is formed on one surface of the ceramic body at a region of the second lead-out portion that is not overlapped with the first lead-out portion in the thickness direction of the ceramic body.

10. The method of claim 8, wherein in the forming of the insulating layer, the insulating layer is formed by applying ceramic slurry to one surface of the ceramic body so as to cover the entirety of the exposed portions of the first and second lead-out portions.

* * * * *